United States Patent
Eardley et al.

(10) Patent No.: US 8,554,183 B2
(45) Date of Patent: *Oct. 8, 2013

(54) CALL CONTROL

(75) Inventors: Philip L Eardley, Ipswich (GB); Simon P. A Ringland, Ipswich (GB); Matthew D Walker, Felixstowe (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/262,437

(22) PCT Filed: Mar. 11, 2010

(86) PCT No.: PCT/GB2010/000434
§ 371 (c)(1),
(2), (4) Date: Sep. 30, 2011

(87) PCT Pub. No.: WO2010/112803
PCT Pub. Date: Oct. 7, 2010

(65) Prior Publication Data
US 2012/0028622 A1     Feb. 2, 2012

(30) Foreign Application Priority Data

Mar. 30, 2009   (GB) .................... 0905454.5

(51) Int. Cl.
*H04W 4/12* (2009.01)
*H04W 4/16* (2009.01)

(52) U.S. Cl.
USPC .......................................... 455/413; 455/417

(58) Field of Classification Search
USPC ............. 455/417, 456.1, 11.1, 450, 445, 405, 455/433; 370/352; 379/88.19, 88.12, 88.14, 379/88.17, 211.01, 269; 358/442, 1.15

See application file for complete search history.

(56) References Cited

U.S. PATENT DOCUMENTS

| 6,021,176 A | 2/2000 | McKendry et al. |
| 6,438,214 B1 | 8/2002 | Yun |

(Continued)

FOREIGN PATENT DOCUMENTS

| EP | 0 550 975 A2 | 7/1993 |
| EP | 0 637 159 | 2/1995 |

(Continued)

OTHER PUBLICATIONS

Search Report (1 pg.) dated Jul. 6, 2009 issued in GB 0905454.5.

(Continued)

*Primary Examiner* — Kiet Doan
(74) *Attorney, Agent, or Firm* — Nixon & Vanderhye P.C.

(57) ABSTRACT

A method of call control in which a first communications network, detecting calls directed to a destination in the first network; redirects at least some of the calls to a destination in a second network (e.g. on no answer from the destination in the first network). The first communications network obtains from a client on a terminal associated with the destination in the second network a value for the time delay before a call to the destination in the second network is redirected in the second network on no answer to an alternative destination and sets a delay period to a value less than the value of the time delay obtained from the client. When one of the plurality of calls redirected to the second network is not answered in the second network within the delay period, the first communications network redirects the call to an alternative destination associated with the first network.

9 Claims, 4 Drawing Sheets

(56) References Cited

U.S. PATENT DOCUMENTS

| | | | |
|---|---|---|---|
| 6,584,110 B1 | 6/2003 | Mizuta et al. | |
| 6,856,806 B1 | 2/2005 | Bosik et al. | |
| 7,340,040 B1 | 3/2008 | Saylor et al. | |
| 2004/0017803 A1* | 1/2004 | Lim et al. | 370/356 |
| 2004/0209606 A1 | 10/2004 | Cleary et al. | |
| 2005/0003831 A1* | 1/2005 | Anderson | 455/456.1 |
| 2005/0117731 A1 | 6/2005 | Pearson | |
| 2006/0008059 A1 | 1/2006 | Ying et al. | |
| 2007/0010233 A1 | 1/2007 | Wang et al. | |
| 2007/0060137 A1 | 3/2007 | Yeatts et al. | |
| 2007/0070976 A1 | 3/2007 | Mussman et al. | |
| 2007/0147595 A1 | 6/2007 | Daniell | |
| 2008/0220756 A1* | 9/2008 | Liu | 455/417 |
| 2010/0119047 A1 | 5/2010 | Pike et al. | |

FOREIGN PATENT DOCUMENTS

| | | |
|---|---|---|
| WO | 00/39990 | 7/2000 |
| WO | 2005/055488 A2 | 6/2005 |

OTHER PUBLICATIONS

Search Report (1 pg.) dated Jun. 2, 2009 issued in GB 0905456.0.

Written Opinion and International Preliminary Report on Patentability issued in International Application No. PCT/GB2010/000434 (7 pgs.).

Written Opinion, International Preliminary Report on Patentability and International Search Report issued in International Application No. PCT/GB2010/000444 (8 pgs.).

Tru (mobile network), Wikipedia internet article retrieved Jan. 25, 2012 from: http://en.wikipedia.org/wiki/Tru_(mobile_network).

3GPP TS 24.228 V5.15.0 (Sep. 2006), Technical Specification, $3^{rd}$ Generation Partnership Project; Technical Specification Group Core Network and Terminals; Signalling flows for the IP multimedia call control based on Session Initiation Protocol (SIP) and Session Description Protocol (SDP); Stage 3 (Release 5).

International Search Report for PCT/GB2010/000434, mailed May 31, 2010.

* cited by examiner

```
<wap-provisioningdoc>
  <characteristic type="Tapi">
    <characteristic type="<FWD_CODE>">
      <characteristic type="<INFOCLASS>">
        <parm-query name="TAPI_FORWARD_ADDRESS"/>
310     <parm-query name="TAPI_FORWARD_TIMEOUT"/>
        <parm-query name="TAPI_FORWARD_ENABLED"/>
      </characteristic>
    </characteristic>
  </characteristic>
</wap-provisioningdoc>
```

```
<wap-provisioningdoc>
  <characteristic type="Tapi">
    <characteristic type="No-reply">
      <characteristic type="No-reply">
320     <parm name=" TAPI_FORWARD_ADDRESS " value="07777777777" />
        <parm name=" TAPI_FORWARD_TIMEOUT " value="10" />
        <parm name=" TAPI_FORWARD_ENABLED " value="1" />
      </characteristic>
    </characteristic>
  </characteristic>
<wap-provisioningdoc>
```

Figure 3

CALL CONTROL

This application is the U.S. national phase of International Application No. PCT/GB2010/000434 filed Mar. 11, 2010 which designated the U.S. and claims priority to GB 0905454.5 filed Mar. 30, 2009, the entire contents of each of which are hereby incorporated by reference.

The present invention relates to the field of telephony networks in general and to the control of calls in telephony networks in particular.

An increasing number of telephone subscribers have more than one telephony account, benefiting from the increased flexibility and improved accessibility that multiple accounts can provide. For example, a subscriber may have a first, Wi-Fi telephony account and a second, GSM telephony account (a list of acronyms is provided at the end of the description). In such a telephony system, the Wi-Fi account can often be out of operation either because the Wi-Fi handset is switched off or is out of range of the nearest Wi-Fi access point (or "hotspot"). It is therefore convenient for the user, when their Wi-Fi telephony account is unavailable, for calls directed to the user at their Wi-Fi account to be redirected to a second telephony account, e.g. one provided via the GSM networks. A problem arises in the case of such re-directed calls when the call is not answered at the handset operating on the second network to which the call has been redirected. The default behaviour of a telephony system in this situation would be for the call to be forwarded to a messaging service, e.g.: voicemail service, associated with the handset in the second network, to which the call has been diverted. This behaviour, however, can lead to confusion for the user with messages, which should be associated with, and directly accessible from, their Wi-Fi handset, being instead associated with their GSM handset. In addition, the user may have to pay the second network operator for a second diversion from the handset in the second network. Similar problems can occur with other combinations of telephony account, such as GSM with PSTN, where calls to the user may be redirected to the PSTN, when the user's GSM handset is switched off or out of range of a GSM transmitter.

The behaviour described above may be less of a problem where both handsets are provided by the same service provider. Published patent application US 2007/0070976 describes a telecommunication system in which a service provider provides both a mobile network and a VoIP network interlinked via a PSTN backbone. Both networks provide telephony services to a user. According to this telecommunication system, calls to the user directed to a terminal on the fixed network may be delivered to a terminal associated with that user on the mobile network. If the call is not completed to the second terminal on the mobile network, the mobile network is able to detect this and to return the call to the fixed network, where it is forwarded to a messaging service on the fixed network.

The telecommunication system of US'976 should work for users who have dual accounts from the same service provider. For example, "TruPhone" from Software Cellular Network, London, England is a service that provides a software application for mobile phones. This application provides end-users with a second Voice-over IP account, which works alongside an existing mobile phone account. In practice, not all users will have dual accounts from the same service provider and not all networks will be set up like the second network of US'976. In a situation where the user has a first account with a first service provider operating a first network and a second account with a second service provider operating a second network, the above system may not work if, as is likely, there is no overall control mechanism that allows the second network to be aware that an incoming call has been redirected from another network or to be alert to the need to return the call, if unanswered, to a messaging service in the other network.

A method of call control and a first communications network are proposed according to which a first network is able to retrieve an unanswered call before the call is forwarded to a messaging service by a second network, where the call is originally intended for a destination in the first network and has been diverted to a destination in the second network, where each network may be operated by a different service provider, in which a controller in the first network makes use of a client on a terminal in the second network to determine the value of delay-before-divert in the second network.

According to the method, a first communications network, detecting calls directed to a destination in the first network; redirects at least some of the calls to a destination in a second network (e.g. on no answer from the destination in the first network). The first communications network obtains from a client on a terminal associated with the destination in the second network a value for the time delay before a call to the destination in the second network is redirected in the second network on no answer to an alternative destination. The first communications network sets a delay period to a value less than the value of the time delay obtained from the client. When one of the calls redirected to the second network is not answered in the second network within the delay period, the first communications network redirects the call to an alternative destination associated with the first network.

The first communications network comprises a network controller arranged in use to detect a call directed to a destination in the first network; and to redirect the call to a destination in a second network. The first network controller comprises: an interface for communicating with a client on a terminal associated with the destination in the second network and for obtaining from the client a value for a time delay before a call to the destination in the second network is redirected in the second network to an alternative destination. The first network controller further comprises: a timer set to a delay period that is less than the value of the time delay received from the client; and a switch arranged in use to redirect the call redirected to the destination in the second network to an alternative destination associated with the first network; when the call is not answered in the second network within the delay period.

The method is facilitated by a communications terminal arranged to operate in a second communications network and to provide to a first communications network a value of a delay period before an unanswered call to the communications terminal received by the second network is forwarded in the second network to a messaging service, or other alternative destination, where each network may be operated by a different service provider.

The communications terminal comprises: a first interface for communicating with a controller in the first network and a second interface for communicating with the second network. The communications terminal is arranged in use to send to the second network via the second interface a request for a value of the delay period. The communications terminal is arranged in use to send via the first interface to the controller in the first network, a value of the delay time received via the second interface in a response from the second network.

For the avoidance of doubt, according to the present invention, redirection of calls to the alternative destination associated with the first network is controlled from the first network.

To aid understanding of the invention, embodiments will now be described by way of example only, with reference to the accompanying drawings in which.

Figure 1A:
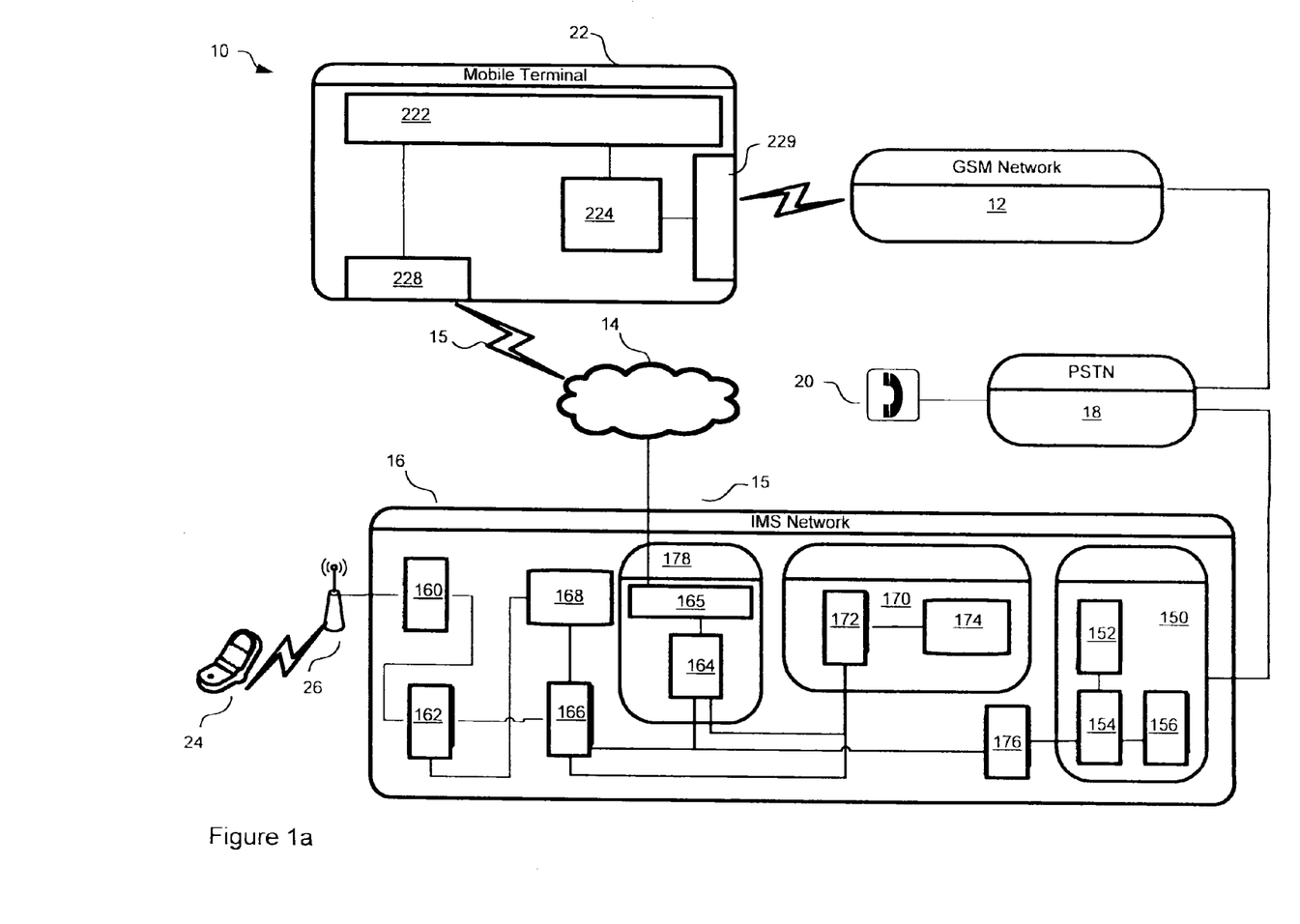
FIGS. 1a and 1b show schematics of a communications system according to the invention.
Figure 1B:
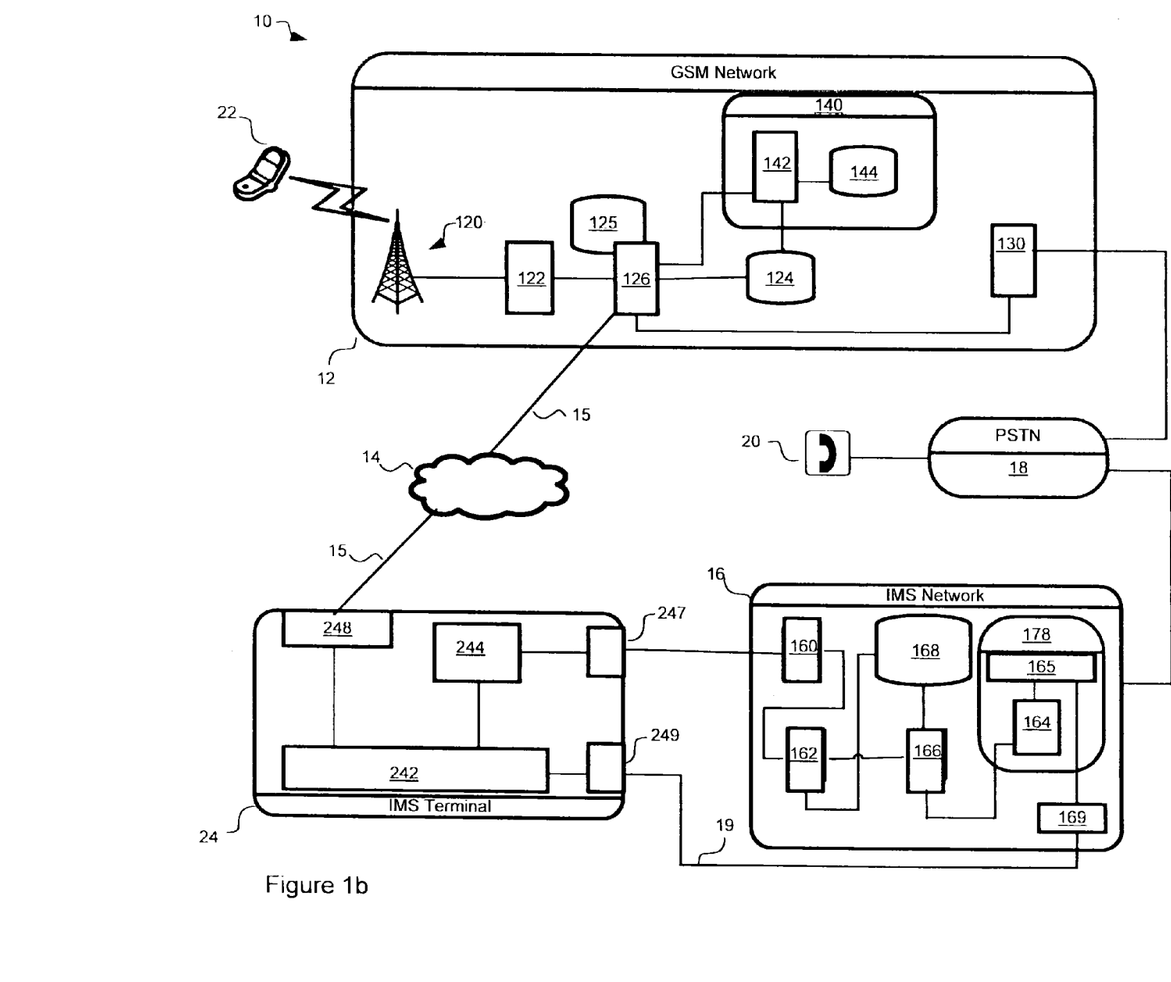

FIGS. 1a and 1b show a schematic of communications system 10 comprising GSM mobile network 12 (shown in detail in FIG. 1b), IMS mobile network 16 (shown in detail in FIG. 1a) and wire-line PSTN 18. Three handsets are shown, each for use with a different communications network. Conventional, wired handset 20 is attached to provide telephone service via PSTN 18. Handset 22 operates in GSM mode via GSM network 12 and handset 24 operates in Wi-Fi mode via IMS network 16.

IP Multimedia Subsystem (IMS) Network

FIG. 1a shows IMS network 16 in detail. As shown in FIG. 1, Wi-Fi handset 24 exchanges radio signals with Wi-Fi access point 26 to IMS network 16. Wi-Fi handset 24 needs to register with the IMS network in order to send and receive messages.

Proxy CSCF (P-CSCF) 160 forms the interface between Wi-Fi handset 24 and the rest of the IMS network. P-CSCF 160 authenticates the user and acts as a proxy, routing the traffic from Wi-Fi handset 24 to interrogating-CSCF (I-CSCF) 162. I-CSCF 162 controls IMS connections destined to users subscribed to the network operator of IMS network 16, or to roaming users currently located within that network operator's service area. I-CSCF 162 acts as the administrative boundary of the IMS network (as P-CSCF 160 could be in a roaming partner's network—FIG. 1a showing a simplified view). Wi-Fi handset 24 connects to P-CSCF 160 via Wi-Fi access point 26. P-CSCF 160 authenticates Wi-Fi handset 24 (via I-CSCF 162 using information from Home Subscriber Server (HSS) 168).

HSS 168 comprises a database containing subscription-related information to support call control in IMS network 16. HSS 168 provides support for authentication, authorisation, naming/addressing resolution, etc. To achieve this, HSS 168 stores the following user related information: user identification, numbering and addressing information; user security information: network access control information for authentication and authorization; user location information at inter-system level. HSS 168 supports the user registration.

Thereafter P-CSCF 160 acts as a proxy forwarding SIP traffic from handset 24 to I-CSCF 162. I-CSCF 162 locates HSS 168 (via a subscriber location function (SLF not shown)) and routes the SIP traffic from Wi-Fi handset 24 to the appropriate instance of Serving-CSCF (S-CSCF) 166.

S-CSCF 166 maintains the session state required by the operator of IMS network 16 in support of session control services for Wi-Fi handset 24. S-CSCF 166 is the main call control element of IMS network 16. It downloads from HSS 168 the user profile which contains a set of triggers that may cause SIP messages to be routed to application servers. Call control functions are implemented by the definition of these triggers and the functions provided by the associated application servers. In the example of FIG. 1a, a trigger might be to route the SIP "invite" message for voice calls to voicemail server 172 if the call hasn't been answered after a specified interval. It's more likely that this function would be implemented by Voice Call application server 178, rather than in S-CSCF 166 itself.

We now consider the placing of an outgoing call and the receipt of an incoming call in IMS network 16.

Outgoing Call from Wi-Fi Handset Via IMS Network

Wi-Fi handset 24 sends a SIP "invite" message to P-CSCF 160. The "invite" message is routed via P-CSCF 160 and I-CSCF 162 to S-CSCF 166. S-CSCF 166 matches the "invite" message to a trigger and, as a result, may forward the "invite" message to voice call server 178. Connection between IMS network 16 and GSM network 12 is effected via PSTN 18. If the called subscriber is located on GSM network 12, the invite message is redirected to the Breakout Gateway Control Function (BGCF) 176 that is connected to PSTN 18. BGCF 176 selects the appropriate Media Gateway Control Function (MGCF) 154 for the selected PSTN 18. MGCF 154 controls the parts of the call state that pertain to connection control for media channels in Media Gateway (MGW) 156. MGW 156 terminates bearer channels from PSTN 18. MGW 156 may also support media conversion, bearer control and payload processing. Signalling Gateway (SGW) 152 provides a signalling interface with PSTN 18. The call is thus routed to the PSTN which, in turn, routes the call to the Gateway Mobile Switching Centre (GMSC) of the relevant GSM network (as described in more detail, below). It would also be possible for the IMS and mobile networks to be connected directly to each other.

Incoming Call to Wi-Fi Handset Via IMS Network

We describe next, an example of a call received at IMS network 16 from PSTN 18.

An incoming call (from PSTN 18, for example) for handset 24 will result in a SIP "invite" message arriving at the instance of S-CSCF (represented in the drawings by S-CSCF 166) allocated to the handset. In the case of a call input from PSTN 18, the call is input via the appropriate instances of BGCF 176 and MGCF 154. S-CSCF 166 downloads a user profile for the intended recipient from the appropriate instance of HSS (represented in the drawings by HSS 168). The user profile includes initial filter criteria including trigger point data which specify how to handle SIP messages matching specified criteria (e.g.: relating to inbound SIP "invite" messages addressed to the user, as opposed to outgoing SIP "invite" messages). As the incoming call is a voice call, S-CSCF 166 finds a match in the filter criteria trigger points, which indicate that the SIP "invite" message is to be forwarded to voice call server 178, incorporating Session Initiation Protocol Application Server (SIP-AS) 164. Voice call server 178 is also provided with network interface 165 for communicating via a data network (such as GPRS, 3G/Wi-Fi, etc) with mobile terminal 22.

Voice call server 178 checks whether the IMS user is currently registered, and, if so, forwards the SIP "invite" message to the SIP client(s) running on the registered user's Wi-Fi handset 24. If the call request is answered by the client in response to the SIP "invite" message, the call is set up accordingly. However, if the user is not currently registered or the user declines the call or fails to answer within a specified period, voice call server 178 forwards the SIP "invite" message to an alternative destination in (for example) GSM network 12 as described above. Voice call server 178 knows where to re-direct the call based on information contained in the user profile.

If the call is answered, either at the handset identified in the SP "invite" message or at an alternative destination, a SIP "answer" message is returned to the network that sent the SIP "invite" message.

GSM Network

FIG. 1b shows GSM network 12 in detail and parts of IMS network 16. GSM handset 22 is shown in detail in FIG. 1a.

GSM handset 22 exchanges via radio interface 229 radio signals with base transceiver station (BTS) 120, operating under control of base station controller (BSC) 122 of GSM network 12. GSM network 12 also comprises home location register (HLR) 124 which includes a database (not shown) of information on users of the mobile network. HLR 124 stores user information, including location, account status and preferences and is maintained by the network operator subscribed to by the user. Both BSC 122 and HLR 124 interact with mobile switching centre (MSC) 126, which is a switch used for call control and processing. MSC 126 also serves as a point-of-access to PSTN 18 via gateway mobile switching centre (GMSC) 130. MSC 126 is associated with visitor location register (VLR) 125 which stores information about all the mobiles that are currently under the control of MSC 126.

GSM network 12 uses HLR 124 to obtain up-to-date location information about a user so that a call can be delivered to the user regardless of their location in the telephone network at the time. GMSC 130 provides an interface with PSTN 18 and determines the appropriate MSC to which an incoming call to a mobile user should be directed (i.e. the MSC at which the called user is currently recorded as being located). GSM network 12 queries HLR 124 to determine which MSC (out of a plurality represented in FIG. 1 by MSC 126) is currently providing service to the user.

Incoming Call to GSM.

The network in which the call originates (for example: IMS) uses the GSM phone number of the called subscriber to locate the GMSC for the service provider serving the called subscriber. Once the appropriate GMSC (represented in the drawings by GMSC 130) has been identified, the originating network sends to it an ISUP "initial address message".

GMSC 130 requests routing information for the called GSM subscriber from the Home Location Register (represented in the drawings by HLR 124) allocated to the called subscriber. HLR 124 uses the dialed number carried in the "initial address" message to locate a record for the subscriber. The SS7 address for the MSC and VLR serving the subscriber (represented in the drawings by MSC 126 and VLR 125) is obtained from this record.

HLR 124 then contacts MSC/VLR 126, 125 serving the subscriber and requests the assignment of a temporary roaming phone number to the called subscriber. In response to the request from HLR 124, MSC/VLR 126,125 allocates a temporary roaming phone number (MSRN—Mobile Station Roaming Number) to the called subscriber and passes it to HLR 124, which passes it in turn to GMSC 130. GMSC 130 uses the temporary roaming phone number to route the call to MSC/VLR 126,125.

The destination phone is paged, via all base station controllers (BSC) connected to MSC 126. Each BSC (represented in the drawings by BSC 122) connected to MSC 126 sends a "page" message to all cells that serve the subscriber's current location area. The base transceiver stations (represented in the drawings by BTS 120) for each of these cells broadcast the "page" message received from their BSC on a dedicated paging channel which all mobile phones listen to every few seconds.

The destination phone, on finding that an identifier specified in a "page" message matches its own identifier, acknowledges the receipt of the call setup request. MSC 126 receives the acknowledgement and sends an ISUP "address complete" message to GMSC 130, which forwards it to the originating network. When the called subscriber answers the call, an ISUP "answer" message is sent by MSC 126 to GMSC 130. The call is now set up.

The above description relates to a call successfully connected through to a destination in GSM network 12 from a source located in another network outside of GSM network 12, for example a call originating in or redirected from PSTN 18 or IMS network 16.

Figure 2:
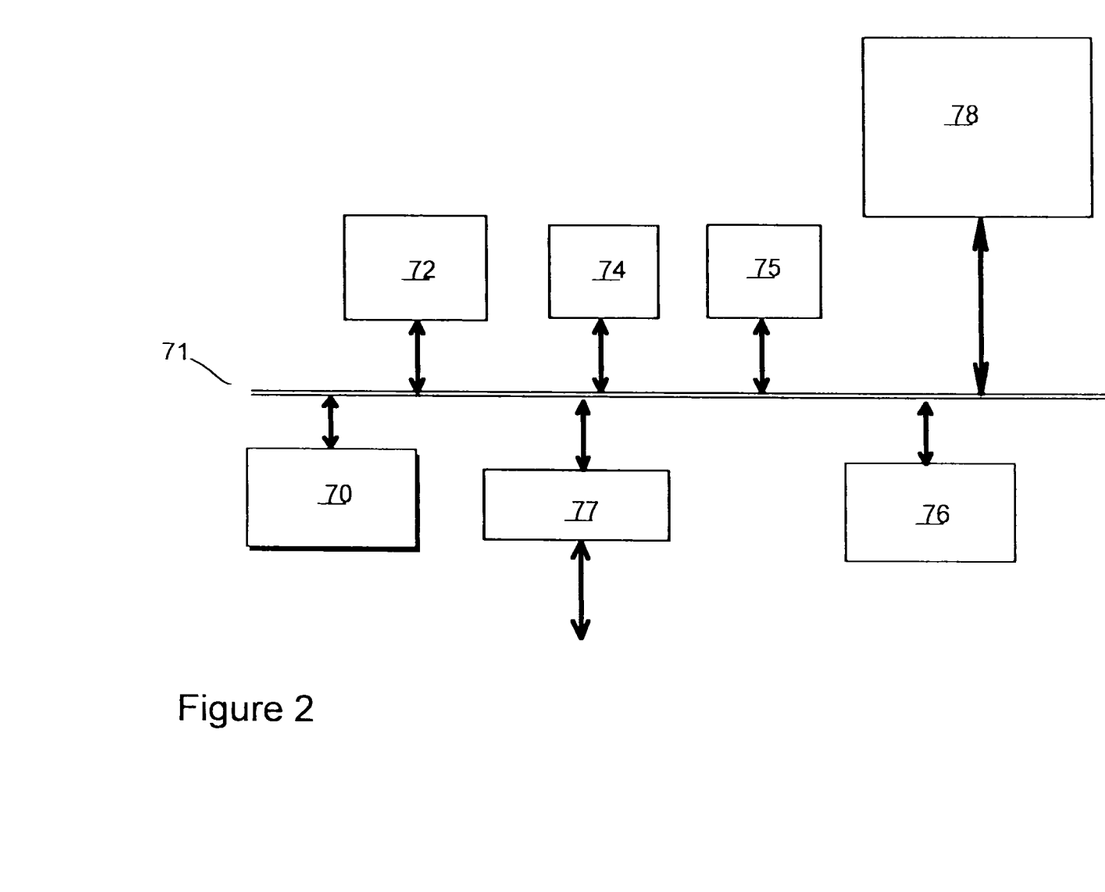
FIG. 2 shows a schematic of a server for implementing the invention.

As will be understood by those skilled in the art, GMSC 130, MSC 126 and Voice call server 178, described above may be implemented as one or more commercially available server or similar general-purpose processing means, as illustrated in FIG. 2. FIG. 2 shows a typical architecture for a server suitable for implementing the network controller of the invention according to a further embodiment of the invention. In practice, a number of such servers will typically be required. The server comprises a central processing unit (CPU) 70 for executing software programs and managing and controlling the operation of the processing means. The CPU 70 is connected to a number of devices via a bus 71, the devices including a storage device 72, for example a hard disk drive for storing system and application software and memory devices including ROM 74 and RAM 75. The server further includes communications interfaces 77 for interfacing to external network components (for example other components within IMS network 16 or GSM network 12 and via data link 15 between GSM handset 22 and Voice call server 178). The server can also include user input/output devices such as a mouse and keyboard (not shown) connected to the bus 71 via an input/output port 76, as well as a display 78. It will be understood by the skilled person that the above described architecture is not limiting, but is merely an example of typical server architecture. It will be further, understood that the described server has all the necessary operating and application software to enable it to fulfil its purpose.

Mobile Client

We now describe how a redirecting network uses a client located on the terminal operating with the second network to which the call is redirected to determine a value for delay-before-divert set for the destination terminal. According to a first embodiment, the redirecting network is IMS network 16 and the client is located on GSM handset 22. According to a second embodiment, the redirecting network is GSM network 12 and the client is located on IMS handset 24.

The first embodiment will now be described with reference to FIG. 1a. Voice call server 178 in a first network (e.g.: IMS network 16) from which a call is redirected, e.g. on no answer, makes use of a client (e.g.: "divert-delay discovery client" 222) on a terminal operating with a second network (e.g.: mobile terminal 22 operating with GSM network 12) to which the call is redirected from the redirecting network. The redirecting network interrogates divert-delay discovery client 222 to determine the value of delay-before-divert-to-voicemail (or other alternative destination) set for the terminal operating with the second network. GSM handset 22 communicates via data interface 228 over a data connection to IMS network 16 set up over any available data network (e.g.: GPRS, 3G/Wi-Fi, etc) typically passing via Internet 14.

Installation of Divert-Delay Discovery Client on GSM

The divert-delay discovery client application is delivered to mobile device 22 by the operator through the use of OMA Device Management: a standard mechanism proposed by the Open Mobile Alliance of San Diego, Calif. 92122 USA, and supported in Windows Mobile. OMA Device Management is designed to assist network operators in configuring and installing applications on small mobile devices such as mobile phones, PDAs and palm top computers. As part of this, OMA Device Management enables software upgrades—providing for new software, including applications, to be loaded onto the device. The new software is essentially pushed to mobile device 22 from a device management server (not shown), operated by or on behalf of the operator, e.g.: by means of a one-way push of an OMA client provisioning (WAP-based) XML file.

To load divert-delay discovery client 22 application, the operator sends a binary SMS message (e.g.: a service indication (SI) message) to the mobile device. The SI message contains a hyperlink with a uniform resource locator pointing to a copy of the client application which it is desired to install; the copy being located on a server on the internet. Mobile device 22 responds to the SI message by downloading and installing the desired client application. Mobile device 22 may download and install the application automatically or may first prompt the user to confirm if they wish to install the application, and only proceed if confirmation is received. The user prompt may take the form of a dialog box on the screen of the mobile device, prompting the user to follow the link. To allow installation to proceed, the user selects the link shown in the dialogue box. As part of the installation, the application is configured to automatically start when the device powers-on.

An alternative form of binary SMS message which may be used to load divert-delay discovery client 22 application is the Service Loading (SL) message. SL messages contain the actual provisioning file and are automatically processed on a mobile device by the operating system, without any user involvement.

Divert-delay discovery client 222 operating on mobile device 22 is preconfigured with the DNS domain name of Voice call server 178 in IMS network 16. Divert-delay discovery client 222 is linked within mobile device 22 with data interface 228, through which client 22 is able to establish, for example, via Internet 14, a data connection to Voice call server 178 in IMS network 16 via IMS network interface 165 over any available data network (e.g.: GPRS, 3G/Wi-Fi, etc.). This data connection might be in the form of a TCP socket accessing a web-service based API on Voice call server 178. The data connection is used by divert-delay discovery client 222 to provide to Voice call server 178 a unique identifier for mobile terminal 22 (e.g. its phone number (MSISDN)) and the value of delay-before-divert-to-voicemail for mobile terminal 22. The delay might typically be communicated as a number of seconds.

Divert-delay discovery client 222 operating on mobile device 22 also has an API onto the mobile network (e.g. GSM) subsystem 224 (described below) operating on mobile device 22 and communicating with GSM network 12 via radio interface 229.

Operation of Divert-Delay Discovery Client on GSM

Operation of the communications system of the invention will now be described with reference to FIG. 1a. In an initial step: divert-delay discovery client 222 sends a query to mobile network subsystem 224 requesting details of the current divert-on-no-answer delay (divert-delay) for mobile device 22. On receipt of a response providing the requested details, divert-delay discovery client 222 stores the result, sets up a data connection to Voice call server 178 and sends the divert-delay information to Voice call server 178, together with the identity of the mobile device 22 (e.g. MSISDN). In order to do this, divert-delay discovery client 222 calls, for example, a Windows Mobile API (described below). This API call causes mobile network subsystem 224 on mobile device 22 to send a query via radio interface 229 to mobile network 12 requesting details of the divert-on-no-answer configuration for mobile device 22. Mobile network 12 responds to mobile network subsystem 224 on mobile device 22 with the requested information. Mobile network subsystem 224 returns the requested information to divert-delay discovery client 222 as the result of the API call.

The operation of divert-delay discovery client 222, described above, could be programmed to run once on device start-up and at specified time intervals thereafter in order to provide updates. According to an enhanced arrangement, an alert is generated automatically when the value of divert-delay changes. When run periodically, divert-delay discovery client 222 checks the current divert-delay against the stored value and, if different, stores the new value and sends the updated divert-delay information to Voice call server 178 in the redirecting network, IMS network 16.

Operation of Redirecting Network (IMS)

Voice call server 178 in the redirecting network, IMS network 16, receives the value, provided by client 222, of divert-delay for mobile device 22. Voice call server 178 processes the received divert-delay value and defines a delay period equal to the received delay value less a specified margin (e.g. one second, or one ring-period) and stores this value for future use. Suitable storage may be found in the user profile in HSS 168, or alternatively, in a separate database managed by Voice call server 178.

Voice call server 178 monitors, through notifications provided by GSM network 12, the behaviour of the GSM network upon receiving a call redirected from IMS network 16.

The notifications are received at voice call server 178 in the form of SIP "ringing" and "answer" messages. The SIP "answer" message (i.e.: "200 OK") may be triggered by the call being answered in GSM network 12. Voice call server 178 runs a second timer set to the delay period it has defined. The second timer is started on receipt of an SIP "ringing" message and either generates a signal or is checked to indicate when the delay period elapses.

Successful Redirection Case (Call to Wi-Fi Handset Redirected to GSM).

For the successful redirection case, Voice call server 178 receives notification from GSM network 12 that the call has been answered at a destination in GSM network 12 before the timer has indicated that the delay period has elapsed. In this case, no further action is taken for that call, which is assumed to have been correctly terminated in GSM network 12.

Unsuccessful Redirection Case (Call to Wi-Fi Handset Redirected to GSM).

For the unsuccessful redirection case, however, the timer indicates that the delay period for the call has elapsed before any "answer" message for that call has been received from GSM network 12. Voice call server 178 determines that the unanswered call should be diverted back to a messaging service (i.e.: voicemail function 170) in IMS network 16 that is associated with the Wi-Fi handset that was the original destination for the call. This is done to prevent the call being answered by a messaging service (i.e.: voicemail function 140) in the "wrong" network, i.e.: in this case, GSM network 12. Voice call server 178 cancels the forwarded call to the GSM network (sends a SIP "bye" message) and forwards the call to IMS messaging service 170 (sends a SIP "invite" message). The IMS messaging service accepts the diverted call request and the caller is connected to voicemail server 172.

Implementation of Divert-Delay Discovery Client

An example implementation of divert-delay discovery client in a Smartphone running the Windows Mobile operating system is now described with reference to FIG. 3. According to this example, an XML query is used to discover device settings in the network. Divert-delay discovery client 22 calls an API called DMProcessConfigXML and provides the API with an XML document containing markup document of the style shown at 310 in FIG. 3. XML document 310 is used to set parameter values. XML document 310 includes characteristics FWD_CODE and FWD_CODE/<INFOCLASS>. The FWD_CODE characteristic is used to configure the call forwarding settings. The FWD_CODE/<INFOCLASS> characteristic determines the class of information. Possible values for FWD_CODE are given in Table 1 and possible values for FWD_CODE/<INFOCLASS are given in Table 2, below.

TABLE 1

FWD_CODE

| Value | Description |
| --- | --- |
| No-Reply | Forward when there is no reply. |
| Not-Reachable | Forward when not reachable. |
| Busy | Forward when busy. |
| Unconditional | Forward unconditionally. |

TABLE 2

FWD_CODE/<INFOCLASS>

| Value | Description |
| --- | --- |
| All-Bearers | All calls. |
| Voice | Voice calls. |
| Data | Data calls. |
| Fax | Fax calls. |

Figure 3:
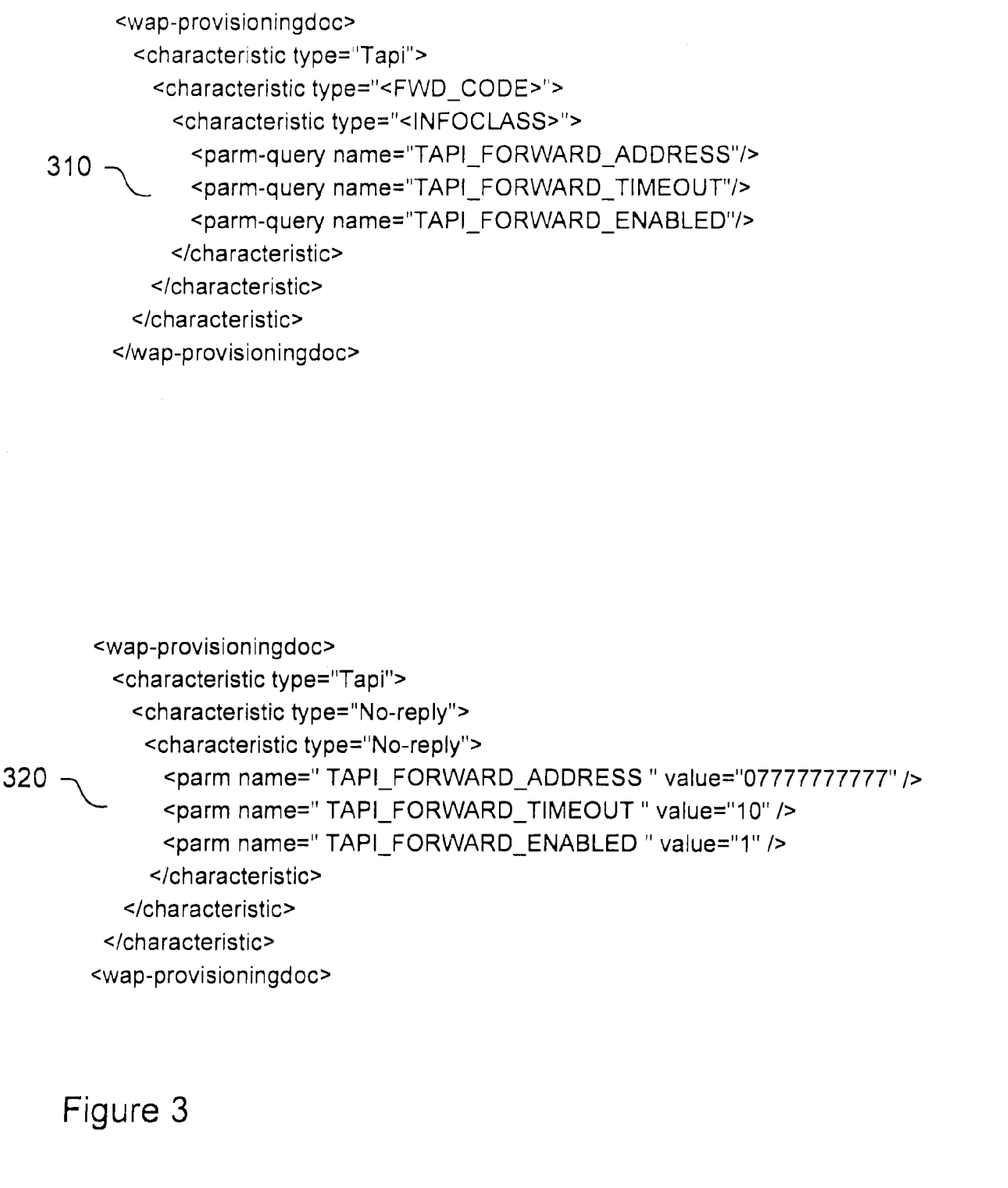
FIG. 3 shows an example of documents for implementing the invention.

Results are received in an XML document of the form shown at 320 in FIG. 3:

Divert delay discovery client on IMS.

The second embodiment, according to which the redirecting network is GSM network 12 and a divert-delay discovery client is installed on IMS terminal device 24, will now be described with reference to FIG. 1b. According to this second embodiment, IMS terminal device 24 may be either a mobile IMS terminal (e.g. Wi-Fi handset), as shown in FIG. 1a or a fixed IMS terminal (e.g.: IP-based home phone), as shown in more detail in FIG. 1b. In FIG. 1b, IMS divert-delay discovery client 242 is installed, according to a preferred embodiment, on IMS terminal device 24, which is also provided, according to this embodiment, with a data link 15 to MSC 126 in GSM network 12.

According to this embodiment, IMS divert-delay discovery client 242 operating on IMS terminal device 24 is preconfigured With the DNS domain name of MSC 126 in GSM network 12. IMS divert-delay discovery client 242 is linked within IMS terminal device 24 with data interface 248 through which IMS divert-delay discovery client 242 is able to establish, for example, via Internet 14, data link 15 to MSC 126 via any available data network (e.g.: Ethernet, GPRS, 3G/Wi-Fi, etc.). This data connection might be in the form of a TCP socket accessing a web-service based API on MSC 126. The data link is used by IMS divert-delay discovery client 242 to provide to MSC 126 a unique identifier for IMS terminal device 24 (e.g. its phone number) and the value of divert-on-no-answer delay (divert-delay) for IMS terminal device 24. The delay might typically be communicated as a number of seconds.

Rather than passing through the IMS stack 244 on IMS terminal device 24, IMS divert-delay discovery client 242 is connected to IMS network 16 via data interface 249 and data link 19 for the purposes of divert-delay discovery. Data link 19 connects IMS terminal device 24 with voice call preference editor server (VCPES) 169 in IMS network 16. VCPES 169 is in turn connected to voice call server 178 via interface 165 in IMS network 16.

Operation of Divert-Delay Discovery Client on IMS.

IMS divert-delay discovery client 242 sends a query to IMS network 16 requesting details of the current divert-delay for IMS terminal device 24. IMS divert-delay discovery client 242 sends a message to VCPES 169 requesting the value of the current divert-on-no-answer delay, together with the identity of IMS terminal device 24 and any appropriate security credentials. VCPES 169 fetches the delay value from a database (e.g.: HSS 168) and returns, via data link 19, the delay value to IMS divert-delay discovery client 242. On receipt of a response providing the requested details, IMS divert-delay discovery client 242 stores the result, sets up, via data link 15, a data connection to MSC 126 and sends the divert-delay value to MSC 126, together with the identity of IMS terminal device 24. MSC 126 stores the received divert-delay value in a database, for example VLR 125 or a database managed locally by MSC 126.

The operation of divert-delay discovery client 242, described above, could be programmed to run once on device start-up and at specified time intervals thereafter in order to provide updates. According to an enhanced arrangement, an alert is generated automatically when the value of divert-delay changes. When run periodically, divert-delay discovery client 242 checks the current divert-delay against the stored value and, if different, stores the new value and sends the updated divert-delay information to MSC 126 in the redirecting network, GSM network 12.

Operation of Redirecting Network (GSM).

MSC 126 processes the received divert-delay value and defines a delay period equal to the received delay value less a specified margin (e.g. one second, or one ring-period) and stores this value for future use.

MSC 126 monitors, through notifications provided by IMS network 16, the behaviour of the IMS network upon receiving a call redirected from GSM network 12. The notifications take the form of ISUP "address complete" and "answer" messages as described, above. MSC 126 runs a timer set to the delay period it has defined. The timer is started on receipt of ISUP "address complete" messages and either generates a signal or is checked to indicate when the delay period elapses.

Successful Redirection Case (Call to GSM Handset Redirected to IMS).

For the successful redirection case, MSC 126 receives notification from IMS network 16 that the call has been answered at a destination in IMS network 16 before the timer has indicated that the delay period has elapsed. In this case, no further action is taken for that call, which is assumed to have been correctly terminated in IMS network 16.

Unsuccessful Redirection Case (Call to GSM Handset Redirected to IMS).

For the unsuccessful redirection case, however, the timer indicates that the delay period for the call has elapsed before any "answer", message for that call has been received from IMS network 16. MSC 126 determines that the unanswered call should be diverted back to a messaging service (i.e.: voicemail function 140) in GSM network 12 that is associated with the GSM handset that was the original destination for the call. This is done to prevent the call being answered by a messaging service (i.e.: voicemail function 170) in the "wrong" network, i.e.: in this case, IMS network 16. MSC 126 dials the number for GSM messaging service 140 and diverts the call to the messaging service. The GSM messaging service accepts the diverted call request and the caller is connected to voicemail server 140.

The above embodiments are to be understood as illustrative examples of the invention. Further embodiments of the invention are envisaged and will be evident to the skilled reader. It is to be understood that any feature described in relation to any one embodiment may, be used in combination with one or more features of another of the embodiments, or any combination of the embodiments. Furthermore, equivalents and modifications not described above may also be employed without departing from the scope of the invention, which is defined in the accompanying claims.

As will be understood by those skilled in the art, the invention may be implemented in software loaded onto one or more general purpose computers, such as that represented in FIG. 2, any or all of which software may be contained on a computer program product such as a floppy disc, CD-ROM, or magnetic tape so that the program can be loaded onto the one or more general purpose computers. The computer program product used to implement the invention may be embodied on any suitable carrier readable by a suitable computer input device, such as CD-ROM or magnetic media.

The above embodiments are to be understood as illustrative examples of the invention. Further embodiments of the invention are envisaged and will be evident to the skilled reader. It is to be understood that any feature described in relation to any one embodiment may be used alone, or in combination with other features described, and may also be used in combination with one or more features of another of the embodiments, or any combination of the embodiments. Furthermore, equivalents and modifications not described above may also be employed without departing from the scope of the invention, which is defined in the accompanying claims.

Although described above with reference to GSM and Wi-Fi, the skilled reader would understand that the call control arrangements, described above, may equally be applied to a code division multiple access (CDMA), time division multiple access (TDMA), or other types of mobile communications network or, indeed, to various forms of fixed network. Although described above with reference to calls being redirected—on no answer in the second network—to a message service, the invention is equally applicable where the destination for calls redirected on no answer in the second network is another, form of telephony device such as a telephone terminal or pre-recorded announcement. Similarly, the destination of calls retrieved from the second network is not limited to a message service and may, alternatively, comprise another form of telephony device such as a telephone terminal (e.g.: a "parental hotline" to a parent of the owner of the called terminal) or pre-recorded announcement. Reference in the above to a handset or terminal will be understood to include any suitable form of communications terminal, including conventional telephones and telephone-enabled devices such as PDAs and computers.

| Abbreviations. | |
|---|---|
| BGCF | Breakout Gateway Control Function |
| BSC | Base Station Controller |
| BTS | Base Transceiver Station |
| CSCF | Call Session Control Function |
| GMSC | Gateway Mobile Switching Centre |
| HLR | Home Location Register |
| HSS | Home Subscriber Server |
| I-CSCF | Interrogating-CSCF |
| MGCF | Media Gateway Control Function |
| MGW | Media Gateway |
| MSC | Mobile Switching Centre |
| P-CSCF | Proxy CSCF |
| PDA | Personal Digital Assisant |
| PSTN | Public Switched Telephone Network |
| S-CSCF | Serving-CSCF |
| SGW | Signalling Gateway |
| SIP | Session Initiation Protocol |
| SIP-AS | SIP Application Server |

The invention claimed is:

1. A method of call control including, in a first network, detecting a call directed to a destination in the first network;
   redirecting the call to a destination in a second network;
   obtaining from a client on a terminal associated with the destination in the second network a value for the time delay before a call to the destination in the second network is redirected in the second network on no answer to a first alternative destination;
   setting a delay period to a value less than the value of the time delay obtained from the client; and
   when a subsequent call redirected to the destination in the second network is not answered in the second network within the delay period, redirecting in the first network the call to a second alternative destination associated with the first network.

2. The method of call control as claimed in claim 1 in which the first alternative destination is a messaging service.

3. The method of call control as claimed in claim 1 in which the second alternative destination is a messaging service.

4. The method of call control as claimed in claim 1, including establishing a data connection between the client on the terminal associated with the destination in the second network and a controller in the first network and communicating via the data connection from the client to the controller, the value of the time delay.

5. The method of call control as claimed in claim 1, in which the terminal identified with the destination in the second network is a mobile terminal.

6. A non-transitory computer readable medium storing processor executable instructions for causing the method of claim 1 to be carried out when run on a general purpose computer.

7. A first communications network comprising
   a network controller arranged in use to detect a call directed to a destination in the first network; and to redirect the call to a destination in a second network; in which the network controller comprises:
   a first interface for communicating with a client on a terminal associated with the destination in the second network and for obtaining from the client a value for a time delay before a call to the destination in the second network is redirected in the second network on no answer; to a first alternative destination;
   a timer set to a delay period that is less than the value of the time delay received from the client; and a switch arranged in use to redirect to a second alternative destination associated with the first network a subsequent call redirected to the destination in the second network; when the call is not answered in the second network within the delay period.

8. A communications terminal for operating in a second communications network; in which the communications terminal comprises:
   a first interface for communicating with a controller in a first network; a second interface for communicating with the second communications network; in which the communications terminal is arranged in use to send to the second network via the second interface a request for a value of delay period in the second network before a call to the communications terminal is diverted on no answer to an alternative destination; in which the communications terminal is arranged in use to receive via the second interface a response from the second network comprising a value of delay period and to send via the first interface to the controller in the first network, the received value of delay period.

9. The communications terminal as claimed in claim 8 in which the first interface is provided for establishing voice communications via the first network.

* * * * *